March 19, 1929.  T. H. KINGSTON  1,705,979
SCAFFOLDING POLE SPLICE
Filed April 18, 1928
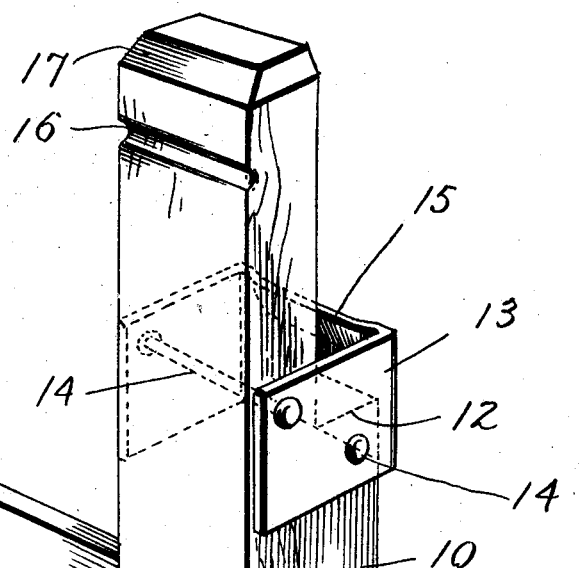
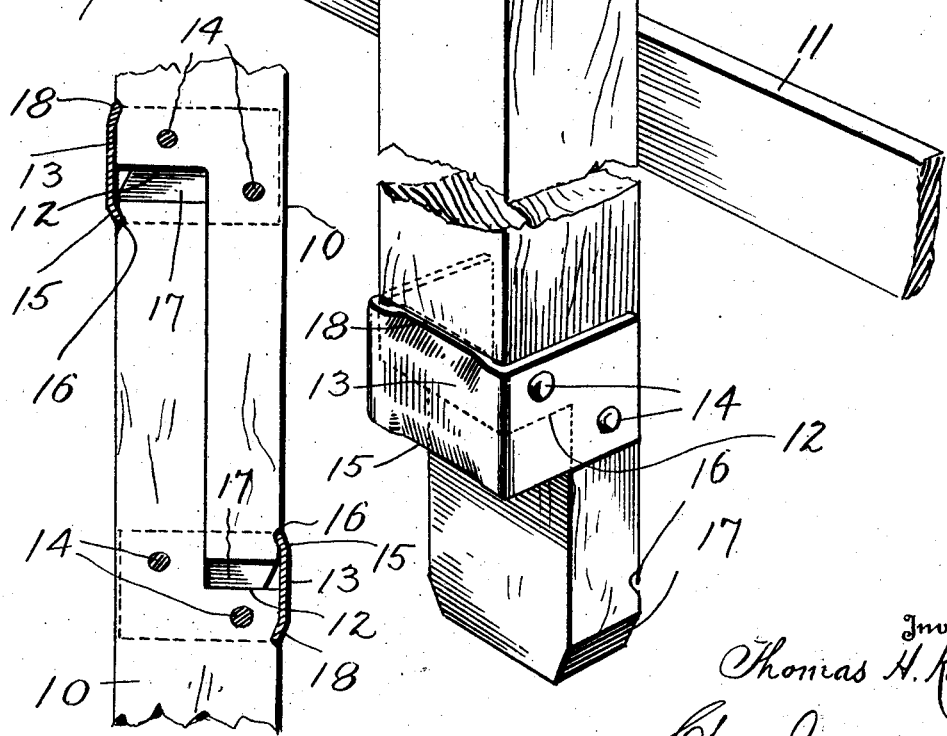
Inventor
Thomas H. Kingston
By Chas. J. Williamson
Attorney Patented Mar. 19, 1929.

1,705,979

UNITED STATES PATENT OFFICE.

THOMAS H. KINGSTON, OF WEST SOMERVILLE, MASSACHUSETTS, ASSIGNOR TO BUILDER'S PATENT SCAFFOLDING COMPANY, OF WEST SOMERVILLE, MASSACHUSETTS, A PARTNERSHIP COMPOSED OF FRANK G. KINGSTON, A. R. KINGSTON, C. C. PIMM, AND MABEL G. KITCHEN.

SCAFFOLDING POLE SPLICE.

Application filed April 18, 1928. Serial No. 270,973.

My invention relates to scaffolding used in the erection of or work upon buildings and in particular concerns pole splice means which are required in scaffoldings that after use are knocked down or dismantled for further use elsewhere. The object of my invention is to provide a splice means of the utmost simplicity so that the cost will be the minimum and assembly and dismantling may be expeditiously done with the minimum of time and labor and which notwithstanding these characteristics will have that strength and rigidity so vitally important in structures which involve the safety of life and limb.

My invention consists in whatever is described by or is included within the terms or scope of the appended claims.

In the drawings:

Fig. 1 is a perspective view of a portion of a scaffolding with pole splice means embodying my invention;

Fig. 2 is a vertical section thereof.

Referring in detail to what is shown in the drawings, the pole, 10, is formed of the desired number of sections determined by the height of the building placed in vertical alinement and to which is attached ledgerboards, a fragment, 11, of one such boards being shown in the drawing. Each pole section at both ends is halved by a median vertical cut so that the end portion of one section will overlap the adjacent end portion of another section, the overlapping portions being of the same length so that the extremity of one section will abut against the horizontal seat, 12, on the other section. Each section has adjacent the seat, 12, a metal flat-sided strap or loop, 13, which may extend entirely around the pole section or about three sides thereof and situated so that it extends substantially equally above and below the seat, 12, a socket being thus provided above the seat, 12, closed on all four sides, three sides being of metal, the socket enclosing the extremity of the inserted and overlapping portion of the adjacent pole section. The loop, 13, is strongly and yet simply secured in place by two horizontal bolts or rivets, 14, one of which is situated to pass through the pole section directly beneath or above the seat, 12, according to which end of the pole section is considered and the other being situated in a different horizontal plane and passing through the reduced portion of the pole section.

It is of great importance that no play or lost motion at the splice be possible because as will be evident under the unavoidable swaying motion of the poles under wind and other pressures any loose or slack condition would soon be aggrevated and danger of breakage under the great leverage exerted at the splice would exist. To secure the desired and important tightness at the splice and yet by means that will not interfere with the ready assembly and separation of parts, I bend or push inward the edge of the wall of the loop, 13, which forms or provides the outer side of the socket so as to produce or provide an inturned lip, 15, which will enter and interlock with a corresponding groove, 16, in the adjacent pole section and as this lip slants or extends at an angle it will be seen that the inserted portion of the pole section may be removed without great effort by a longitudinal movement of the pole section. To facilitate assembly, the extremity of the inserted pole section has bevels or chamfers, 17, and preferably the opposite edge of the loop to that having the lip, 15, is similarly bent or pushed inward to provide a lip, 18, that interlocks with the adjacent surface of the pole section.

It will be seen that I have provided a pole splice with characteristics of construction called for by the special requirements of scaffolding and the device is of the utmost simplicity, permits easy assembly and dismantling and yet has all strength and security required in a scaffolding member.

I claim:

1. A scaffolding pole splice comprising pole sections that are substantially halved at their extremities and providing similar portions that overlap on a vertical plane and having horizontal seats and metal straps at the respective seats rigidly secured to the pole sections and extending above and below the respective seats and providing adjacent a seat a socket that comprises three walls of metal.

2. A scaffolding pole splice comprising pole sections that are substantially halved at their extremities and providing similar portions that overlap on a vertical plane and having horizontal seats and metal straps at the respective seats rigidly secured to the pole sections and extending above and below the respective seats and providing adjacent a seat a socket that comprises three walls of metal, one of such walls having an inwardly projecting lip.

3. A scaffolding pole splice comprising pole sections that are substantially halved at their extremities and providing similar portions that overlap on a vertical plane and having horizontal seats and metal straps at the respective seats rigidly secured to the pole sections and extending above and below the respective seats and providing a socket that comprises three walls of metal, one of such walls having an inwardly projecting lip, said lip having an inclined pole section engaging surface.

4. A scaffolding pole splice comprising pole sections that are substantially halved at their extremities and providing similar portions that overlap on a vertical plane and having horizontal seats and metal straps at their respective seats rigidly secured to the pole sections and extending above and below the respective seats and providing a socket that comprises three walls of metal two being at opposite sides of the pole section, and two horizontally extending bolts or rivets passing through said two walls and through the interposed pole section and being situated in different horizontal planes.

In testimony whereof I hereunto affix my signature.

THOMAS H. KINGSTON.